United States Patent [19]

Sato et al.

[11] Patent Number: 5,025,686

[45] Date of Patent: Jun. 25, 1991

[54] AUTOMATIC TRANSMISSION APPARATUS FOR VEHICLE

[75] Inventors: Kazuhiko Sato; Shizuhisa Watanabe, both of Katsuta, Japan

[73] Assignees: Hitachi, Ltd., Tokyo; Hitachi Automotive Engineering Co., Ltd., Katsuta, both of Japan

[21] Appl. No.: 234,758

[22] Filed: Aug. 22, 1988

[30] Foreign Application Priority Data

Aug. 28, 1987 [JP] Japan ................................ 62-214777

[51] Int. Cl.⁵ ............................................. B60K 41/02
[52] U.S. Cl. .................................. 74/866; 192/30 W; 474/18
[58] Field of Search ................. 74/862, 865, 866, 877; 474/11, 12, 18; 192/30 W, 82 T

[56] References Cited

U.S. PATENT DOCUMENTS

| | | | |
|---|---|---|---|
| 1,662,660 | 3/1928 | Clay ................................... | 474/18 X |
| 2,346,047 | 4/1944 | Otto ..................................... | 474/18 |
| 2,350,913 | 6/1944 | Mercer ................................ | 474/18 |
| 2,647,965 | 8/1953 | Michie ............................... | 474/18 X |
| 3,034,368 | 5/1962 | Wingbermuhle et al. ............ | 474/18 |
| 4,579,021 | 4/1986 | Yamamuro et al. ............... | 74/865 X |
| 4,631,043 | 12/1986 | Tokoro et al. ........................ | 474/18 |
| 4,638,689 | 1/1987 | Sakai ................................. | 74/865 X |
| 4,651,142 | 3/1987 | Klatt ............................ | 192/30 W X |
| 4,673,378 | 6/1987 | Tokoro et al. ..................... | 474/28 X |
| 4,708,031 | 11/1987 | Morimoto et al. ................ | 74/867 X |
| 4,722,426 | 2/1988 | Bellanger ...................... | 192/30 W X |
| 4,736,301 | 4/1988 | Osanai ............................... | 74/865 X |
| 4,759,236 | 7/1988 | Tezuka et al. ..................... | 74/867 X |
| 4,771,658 | 9/1988 | Miyawaki ......................... | 74/868 X |

FOREIGN PATENT DOCUMENTS

| | | | |
|---|---|---|---|
| 58-214054 | 12/1983 | Japan ..................................... | 474/18 |
| 62-53243 | 3/1987 | Japan . | |
| 62-166122 | 7/1987 | Japan ..................................... | 74/862 |
| 62-167966 | 7/1987 | Japan ..................................... | 74/865 |

Primary Examiner—Dwight Diehl
Attorney, Agent, or Firm—Antonelli, Terry, Stout & Kraus

[57] ABSTRACT

An automatic transmission apparatus for vehicles include a continuously variable transmission of belt type, and a control unit supplied with a plurality of data relating to a vehicle. The control unit computes output data on the basis of the input data, and generates control signals for changing a pulley width of the continuously variable transmission of belt type, for changing an effective diameter of the pulley and for substantially continuously controlling the transmission ratio on the basis of the output data. The control unit comprises a control signal generator for deciding whether the vehicle is started or not and for generating a control signal to temporarily narrow the pulley width when it is decided that the vehicle is started.

2 Claims, 5 Drawing Sheets

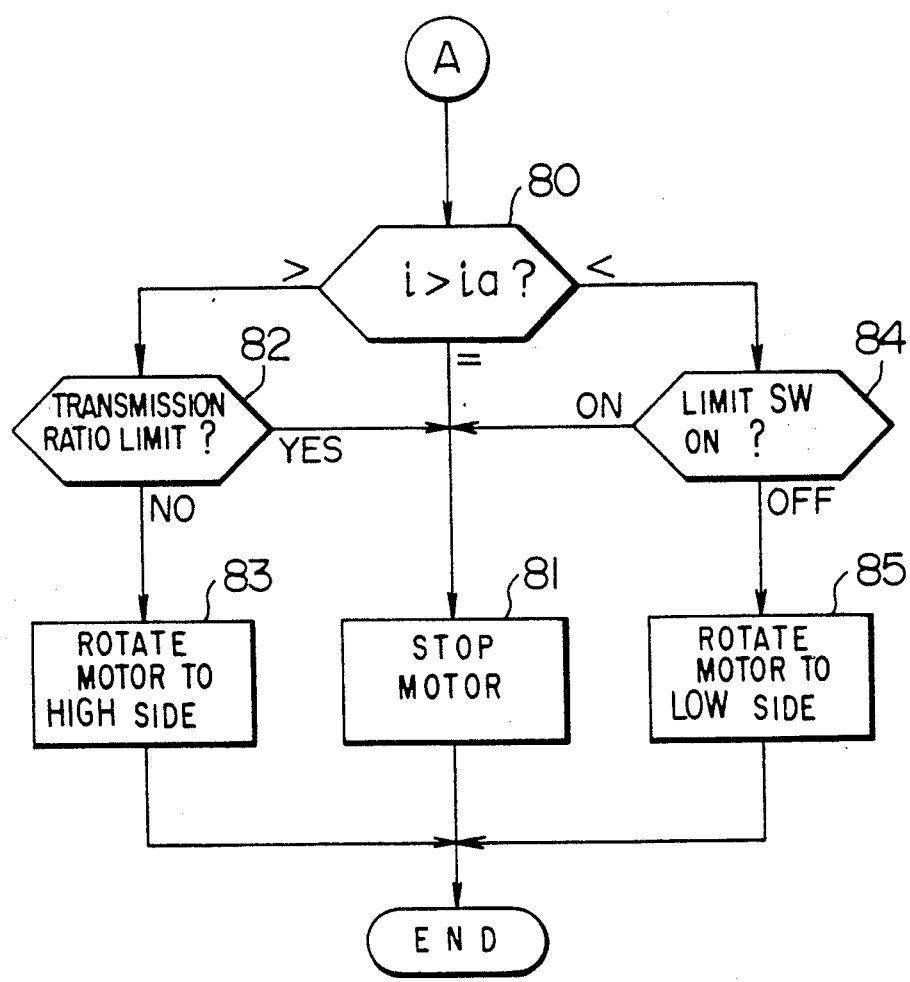
F I G. 5

AUTOMATIC TRANSMISSION APPARATUS FOR VEHICLE

BACKGROUND OF THE INVENTION

The present invention relates to an automatic transmission apparatus for vehicle, and in particular, to an automatic transmission apparatus for a vehicle equipped with a continuously variable transmission mechanism of the belt type which is a mechanical, continuously variable transmission apparatus.

An automobile using an internal combustion engine, such as a gasoline engine, as the prime mover has a transmission mechanism in its turning effort transfer system. In recent years, so-called automatic transmission apparatuses have been increasingly used in order to reduce troublesomeness caused by manual manipulation of the transmission mechanism.

A conventional automatic transmission apparatus mainly uses a hydraulic torque converter. A continuously variable mechanical transmission allowing continuously variable transmission operation within a preset value range was recently adopted as described in JP-A-62-53243, for example.

In a continuously variable transmission mechanism of the belt type used in the apparatus disclosed in JP-A-62-53243, a V-belt is wound across opposed conical pulleys, and the width and the effective radius of the pulley are changed, with the transmission ratio being substantially continuously controlled.

In the above described continuously variable transmission belt type mechanism a hydraulic actuator is used as the drive means for changing the pulley width in some cases.

When the pulley width is controlled by a hydraulic actuator, however, it is necessary to install a seal for preventing oil leakage and to provide a control valve, resulting in a problem of complication of the entire continuously variable transmission belt type mechanism.

Further in recent years, it has been proposed to adopt an electrical actuator as the drive means in order to simplify the structure of the continuously variable transmission belt type mechanism.

In a vehicle such as an automobile, however, a large torque acts between the belt and the conical pulley at the time of starting.

In both a continuously variable transmission belt type mechanism using a hydraulic actuator and a continuously variable transmission belt done mechanism using an electric actuator, slip is caused between the pulley and the belt when the vehicle is started. The driving force is thus abruptly transferred to the belt when the rotation of the pulley has risen up to some degree, resulting in a problem of shock generation.

SUMMARY OF THE INVENTION

Therefore, an object of the present invention is to make it possible to start a vehicle smoothly by using a simple configuration in an automatic transmission apparatus for a vehicle equipped with continuously variable transmission belt type mechanism.

The object of the present invention is attained by a control unit of the continuously variable transmission belt type mechanism which includes means for determining whether the vehicle is to be started or not and for outputting a control signal which temporarily narrows the pulley width when it is determined that the vehicle is to be started.

In the continuously variable transmission belt type mechanism, the pulley width is forcibly narrowed and the force of pressing the belt is enhanced by the above described control means until the starting of the vehicle has been completed. When the present invention is utilized, neither slip nor shock is caused even if a large torque acts between the pulley and the belt when the vehicle is to be started.

BRIEF DESCRIPTION OF THE DRAWINGS

FIGS. 4 and 5 show flow charts for explaining the operation of the vehicle automatic transmission apparatus of FIG. 2.

DESCRIPTION OF THE PREFERRED EMBODIMENTS

An automatic transmission apparatus according to the present invention will now be described in detail by referring to drawings.

Figure 1:
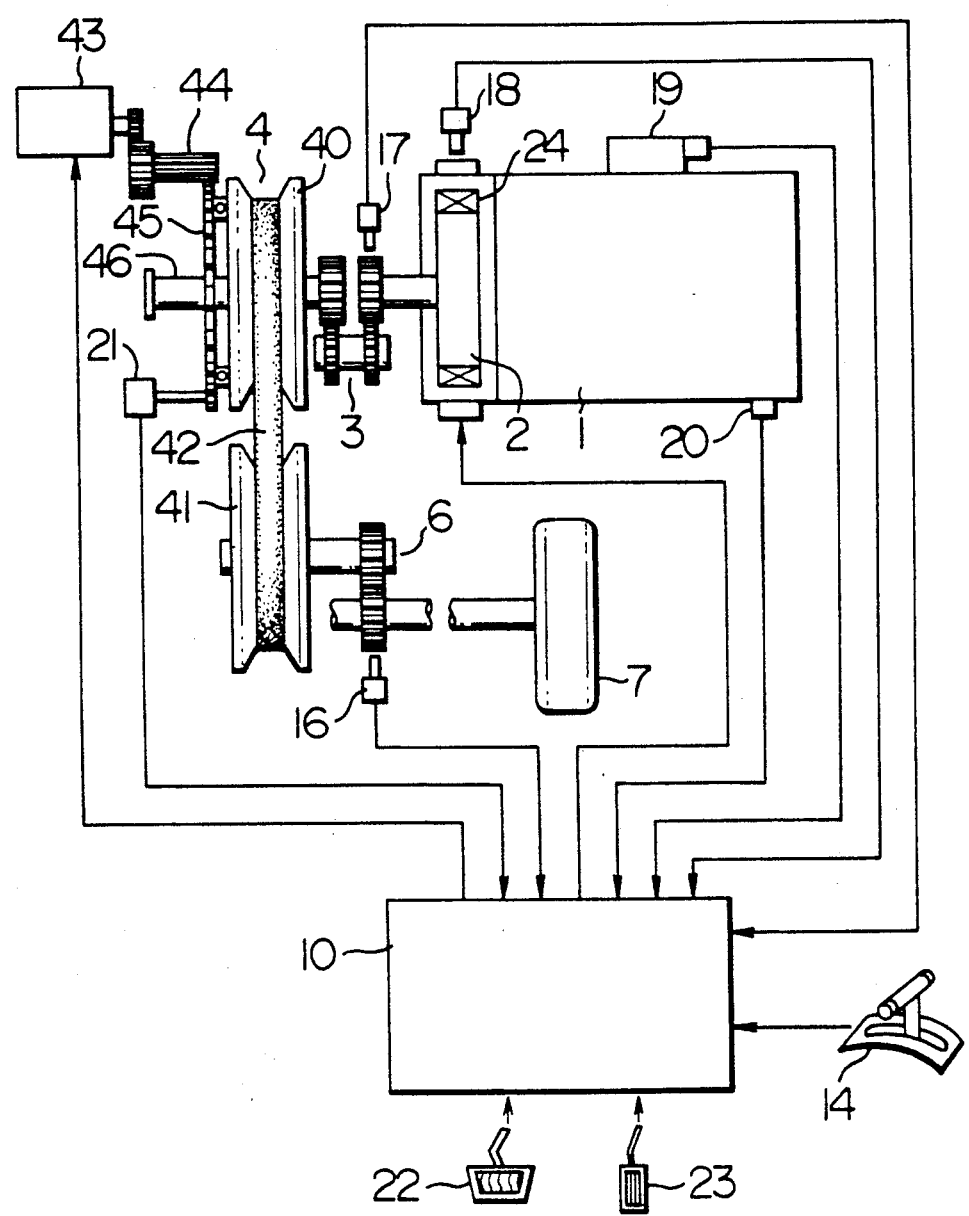
FIG. 1 shows the overall configuration of a vehicle driving apparatus including an automatic transmission apparatus for a vehicle according to the present invention.

FIG. 1 shows an embodiment of the continuously variable transmission apparatus according to the present invention.

The turning effort of an engine 1 is passed through an electromagnetic clutch 2 intermittently, and transferred to a driving wheel 7 via a reduction gear 3, continuously variable transmission mechanism 4 and a differential gear 6, thereby rendering the vehicle capable of running.

As the electromagnetic clutch 2, an electromagnetic powder clutch is used. By letting a current flow through a coil 21 included within the powder clutch, magnetic powders inside the clutch harden to transfer torque.

Further, the continuously variable transmission 4 includs a drive pulley 40, a driven pulley 41, and a V-belt 42 wound across both pulleys. Both the drive pulley 40 and the driven pulley 41 are opposed conical pulleys.

In order to perform a transmission function, it is necessary to change the spacing of the drive pulley 40. In accordance with the present invention, therefore, a pulley retaining plate 45 is moved right and left with respect to the axis of the pulley 4 by an electrical actuator comprising a d.c. motor 43 via a motor reduction gear 44. Thereby the space of the drive pulley 40 is controlled, and the transmission ratio is continuously varied over a predetermined range.

In order to detect situation of respective portions of the continuous variable transmission apparatus, the following sensors are used.

An electromagnetic pickup sensor 18 detects the number of revolutions of the engine, an electromagnetic pickup sensor 17 detects the number of revolutions of the drive pulley 40, an electromagnetic pickup sensor 16 detects the number of revolutions of the driven pulley 41 and the vehicle speed, a throttle sensor 19 detects the opening of the throttle, a water temperature sensor 20 detects the temperature of the engine cooling water, and a pulley position sensor 21 detects the spacing of the drive pulley 40 (i.e., the transmission ratio).

A position selector 14 is used to select one shift lever position out of parking, reverse, neutral and drive positions. An accelerator switch attached to an accelerator pedal 23 detects actuation of the accelerator. A brake switch attached to a brake pedal 22 detects actuation of the brake pedal.

The above described detected signals are supplied to a control unit 10. On the basis of the state of the vehicle and manipulation by the driver represented by these detected signals, the control unit 10 outputs drive pulses to the d.c. motor 43 and the electromagnetic clutch 2.

Figure 2:
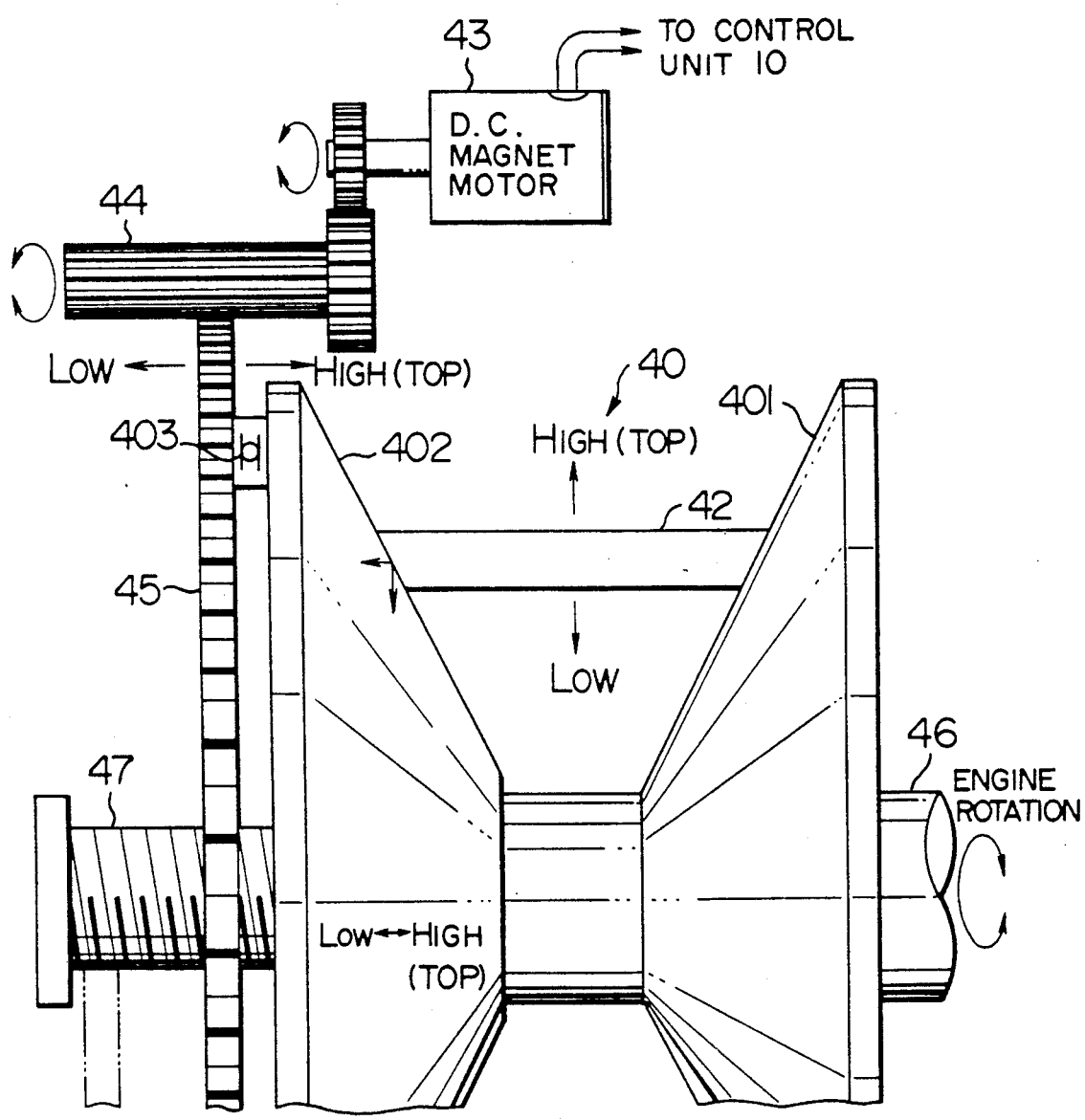
FIG. 2 shows the automatic transmission apparatus for automobile of FIG. 1.

FIG. 2 shows the basic configuration around the drive pulley 40. The pulley 40 receives the engine turning effort via the clutch 2 and the reduction gear 3. The pulley 40 includes a fixed sheave 401 (which performs only rotation) and a movable sheave 402 (which rotates and slides right and left with respect to the pulley shaft). The pulley shaft 46 includes a threaded belt 47 disposed concentrically with the pulley shaft. A slider 45 slides right and left while it rotates along the thread of the belt 47. The slider 45 is coupled to the movable sheave 402 of the pulley via bearing 403. The rotation of the movable sheave 402 of the pulley and the rotation of the slider 45 are mutually independent. Only the amount of sliding to the right/left of the slider 45 is transferred to the movable sheave 402 of the pulley. The slider 45 has teeth formed on its periphery. The teeth interlock with an actuator gear 44, which is driven by the motor 43. In accordance with a control signal supplied from the control unit 10, the d.c. motor 43 is rotated clockwise or counterclockwise. Thereby the rotation is transferred to the slider 45 via the actuator gear 44, and the slider 45 moves on the belt 47 which forms the track of the slider 45. Accordingly, the movable sheave 402 of the pulley slides to the left and right to change the pulley width. If the pulley 40 is rotated, the rotation moves the belt 42 up and down with respect to a direction perpendicular to the pulley shaft, thereby performing the transmission operation. In accordance with the present invention, the transmission ratio is in a range of 0.53 to 2.58. In that range, the amount of slide of the slider 45 changes from the low position to the high or low top position by approximately 30 mm. The driven pulley 41 is always pressed by a spring (not illustrated) in such a direction as to tighten the belt 42. Since the length of the belt 42 is always constant, the drive pulley 40 has a force exerted thereon from the belt 42 in the directions indicated by arrows in FIG. 2. That is to say, the movable sheave 402 always force in such a direction that it will open (i.e., to the left side of the drawing or in the low direction). As for the force exerted upon the motor for controlling the pulley width (i.e., the force required for changing the speed of the motor), the force for sliding the slider to the high position is larger than the force for sliding the slider to the low position.

Figure 3:
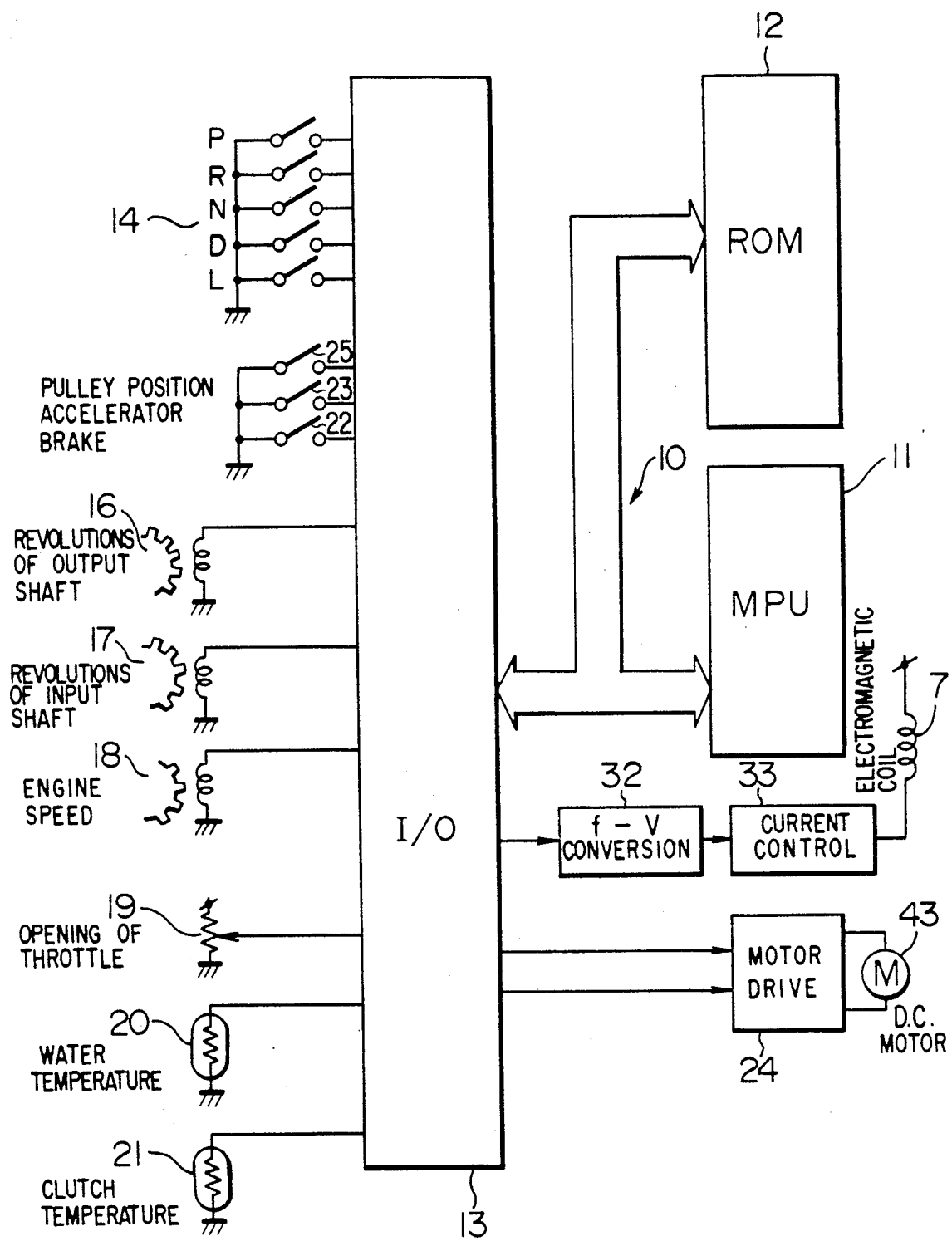
FIG. 3 shows a control unit included in the vehicle driving apparatus of FIG. 2.

FIG. 3 shows the configuration of the control unit 10. A principal portion of the control unit 10 is a microcomputer comprising an MPU (microprocessing unit) 11, a ROM (read-only memory) 12, and an I/O (input/output interface) 13. This control unit 10 is supplied with various data from the position selector switch 14, the state detection switches 22, 23 and 25 for detecting the position of the drive pulley of the continuously variable transmission 4 and states of the accelerator pedal and the brake pedal, the rotation sensors 16 to 18 respectively for detecting the number of revolutions of the output shaft of the continuously variable transmission 4, the number of revolutions of the input shaft of the continuously variable transmission 4 and the engine speed, the variable resistor 19 for detecting the opening of the throttle, and temperature sensors 20 and 21 respectively for detecting the temperature of cooling water of the engine 1 and the temperature of the clutch 2. On the basis of this input data, the control unit 10 computes output data and supplies a control signal to an electromagnetic coil 8 of the electromagnetic clutch 2 via an f-V converter 32 and a current control circuit 33 to control the electromagnetic clutch 2. In addition, the control unit 10 supplies a control signal to the d.c. motor 43 of the continuously variable transmission 4 via a motor drive circuit 24 to control the continuously variable transmission 4.

The data supplied from the position selector switch 14 represent the parking position P, the reverse position R, the neutral position N, the drive position D and a low speed position L of the shift lever, respectively. The data supplied from the state detection switches 22 and 23 represent the fact that the pulley width of the drive pulley 40 of the continuously variable transmission 4 has reached the maximum value, i.e., the transmission ratio has become the maximum, the fact that the accelerator pedal has been returned, i.e., the accelerator has been turned off, and the fact that the brake pedal has been depressed, respectively. These data are supplied to the MPU 11 via the I/O 13.

On the other hand, the rotation sensor 17 detects pulses representing the rotation of the drive pulley 40 of the continuously variable transmission 4. And the rotation sensor 18 detects pulses representing the rotation of the output shaft of the engine 1. The pulses detected by the rotation sensors 17 and 18 are supplied to the I/O 13.

The throttle sensor 19 comprising the variable resistor generates a signal representing the opening of the throttle valve of the engine 1. The temperature sensor 20 generates a signal representing the temperature of generates a signal representing the temperature of the clutch 2. The signals generated by the sensors 19, 20 and 21 are supplied to the I/O 13.

The reason why the temperature sensor 21 is used will now be described. That is to say, the clutch 2 is controlled via the f-v converter 32 and the current control circuit 33 to permit the use even under the semi-clutch state (hereafter referred to as creep). Therefore, there is a fear that the temperature of the clutch 2 will significantly rise. Accordingly, the temperature sensor 21 is disposed so that the control may be performed while watching the temperature change of the clutch 2.

As described above, the I/C 13 supplies control signals to the clutch 2 and the continuously variable transmission 4.

The clutch 2 is supplied with pulse signals having a relatively short period as the control signal. The f-V converter 32 converts the pulse signal supplied from the I/O 13 into voltage proportionate to its duty factor. The current control circuit 33 supplies a current proportionate to the voltage level of the f-V converter 32 to the electromagnetic coil 7 of the clutch 2. As a result, the clutch 2 is capable of controlling the transferred torque in an analog way to start the vehicle smoothly.

The continuously variable transmission 4 receives a pulse signal having a duty factor specifying the turning effort of the d.c. motor 43 and a signal for specifying the direction of rotation, as the control signals. The motor drive circuit 24 amplifies the duty signal and the rotation signal and supplies them to the d.c. motor 43. The d.c. motor 43 is rotated clockwise or counterclockwise with a predetermined turning effort. The pulley width of the drive pulley 40 is thus changed to control the transmission ratio.

These control signals supplied to the clutch 2 and the continuously variable transmission 4 are read out from the ROM 12 in accordance with control programs stored beforehand.

Figure 4:
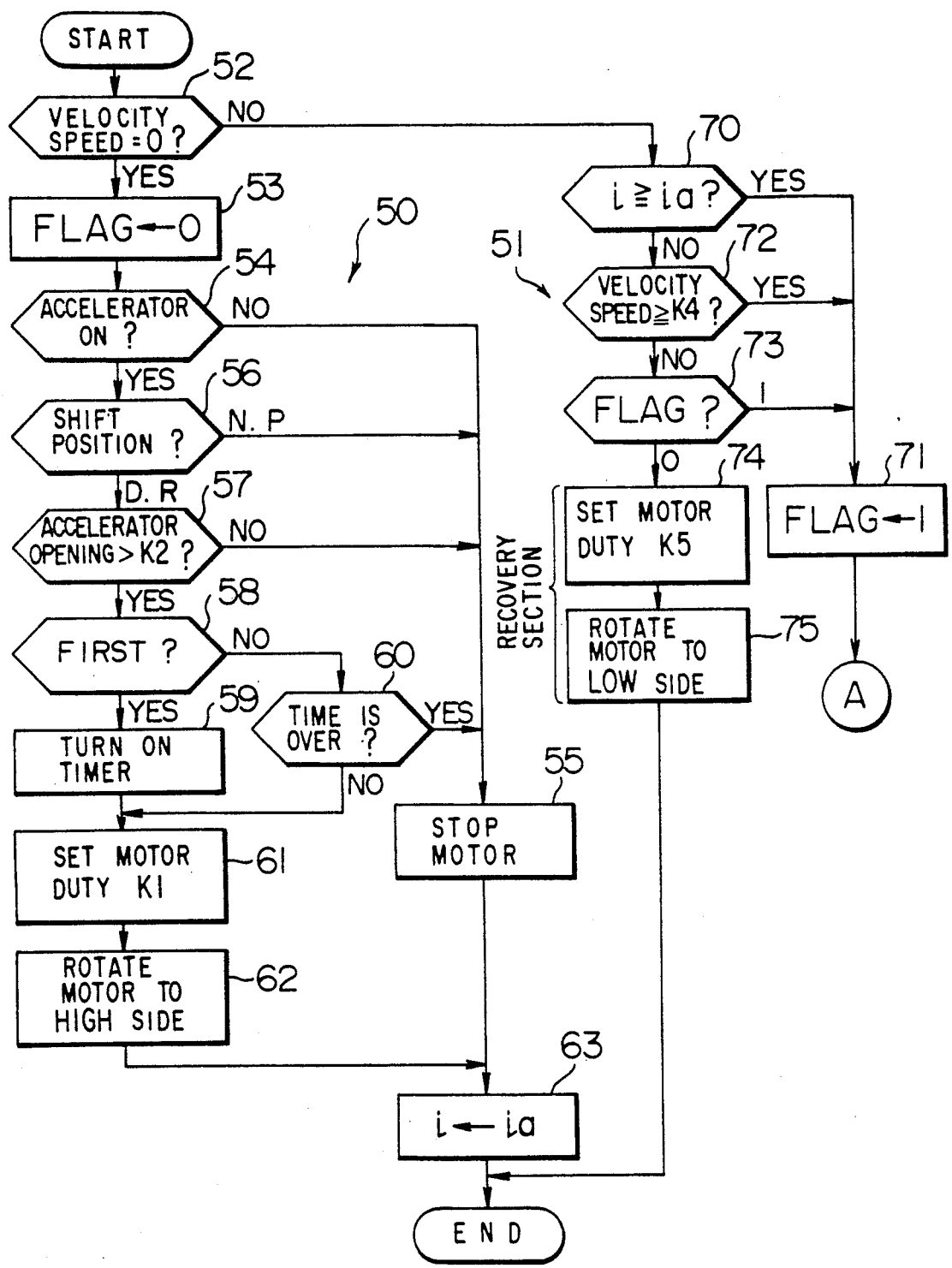

Among the control programs, programs for generating the control signals supplied to be supplied to the continuously variable transmission 4 are shown in FIGS. 4 and 5.

Operation of the automatic transmission apparatus for vehicle according to the present invention will now be described by referring to flow charts shown in FIGS. 4 and 5.

Roughly speaking, the program represented by the flow chart comprises a control loop 50 in vehicle starting and a control loop 51 after starting. In the control loop 50 in vehicle starting, it is decided whether the vehicle is starting or not, and a control signal for temporarily narrowing the pulley width of the continuously variable transmission 4 is outputted when it has been decided that the vehicle is starting. In the control loop 51 after starting, an actual transmission ratio i is derived as the ratio of the number of revolutions of the drive pulley 40 to the number of revolutions of the driven pulley 41, and a desired transmission ratio ia is derived from the vehicle speed and the opening of the throttle valve at that time in accordance with a table having those values as parameters. Further in the control loop 51, the d.c. motor 43 is rotated to control the pulley width so that the actual transmission ratio i may coincide with the desired transmission ratio ia. These control procedures are executed periodically at intervals of 50 ms, for example.

The continuously variable transmission 4 of the present embodiment is so configured that the pulley width of the drive pulley 40 is controlled by the d.c. motor 43 to change the transmission ratio. When the d.c. motor 43 rotates clockwise, the pulley width is opened to cause a large transmission ratio of low gear side. When the d.c. motor 43 rotates counterclockwise, the pulley width is narrowed to cause a small transmission ratio of high gear side.

At step 52 shown in FIG. 4, current vehicle speed is read out in the form of the number of revolutions of the driven pulley 41 detected by the rotation sensor 16. If the vehicle is in the stop state, the control loop 50 in starting is selected. Unless the vehicle is in the stop state, the control loop 51 after starting is selected. When the vehicle speed has a very small value even if the vehicle speed is not zero at step 52, it is regarded that the vehicle is in the starting state and stop state.

In the control loop 50 in starting, a flag is changed to a logic 0 at step 53. On the basis of the opening of the throttle valve detected by the throttle sensor 19, it is decided at step 54 whether the accelerator is on or not. Unless the accelerator is on, a signal for stopping the d.c. motor 43 is generated as a control signal at step 55. If the accelerator is on, the program proceeds to step 56.

At step 56, the shift position of the shift lever is decided on the basis of the position signal of the selector switch 14. If it is decided at step 56 that the shift lever assumes the neutral position N or the parking position P, the program proceeds to the step 55 to stop the motor. If the shift lever assumes the drive position D or the reverse position D, the program proceeds to step 57. On the basis of the opening of the throttle detected by the throttle sensor 19, it is decided at step 57 whether the value of the throttle opening, i.e., the value of the accelerator opening is larger than a predetermined value K2. If the accelerator opening is smaller than K2, the program proceeds to the step 55. If the accelerator opening is larger than K2, the program proceeds to step 58. The predetermined value K2 is the minimum opening of the accelera for deciding with certainty whether the vehicle is in the starting state and whether the belt pressing operation should be actually started. The value of K2 is set at approximately 10 degrees.

At step 58, it is decided whether the control loop 50 is entered for the first time after the flag is changed to a logic 0 at the step 53. If it is decided at the step 58 that the control loop 50 is entered for the first time, the program proceeds to step 59 to turn on a timer. Unless it is decided at the step 58 that the control loop 50 is entered for the first time, the program proceeds to step 60. At step 60, it is decided whether a predetermined time has elapsed since turning on of the timer. When the predetermined time has elapsed, i.e., if the time is over, the program proceeds to the step 55. Unless the time is over, the program proceeds to step 61. In an example, the predetermined time is approximately 2.5 seconds. In order to reduce the burden to the battery and the motor, the predetermined time is preferably 0.5 second.

At step 61, the duty factor of the pulse signal supplied to the d.c. motor 43, i.e., the motor duty is set at a predetermined value K1. The predetermined value K1 is sufficiently large that the belt pressing force due to the d.c. motor 43 does not cause a slip between the belt and the pulley. However, the predetermined value K1 is such a duty factor as not to press the belt largely above and change the effective diameter of the pulley to substantially change the transmission ratio. That is to say, the predetermined value K1 is a duty value in tightening the belt and set at a value equivalent to half of the duty value (100%) of the transmission operation in normal vehicle starting. At step 62, a signal for rotating the d.c. motor 43 counterclockwise to the high gear side is generated together with a pulse signal having the duty factor K1. The counterclockwise rotation signal rotates the d.c. motor 43 counterclockwise via the drive circuit 24 to narrow the pulley width of the drive pulley 40 and enhance the belt pressing force. So long as it is determined at the step 52 that the vehicle is in the stop state, this operation is performed for the time decided at step 60.

Even if a large torque acts between the pulley and the belt when the vehicle is started, slip is not caused and it is thus possible to prevent the occurrence of a shock and perform smooth starting.

As described above, the motor duty factor K1 is set and the belt pressing operation is performed for the predetermined time. When the program proceeds to the control loop 51 after starting, therefore, the drive pulley 40 does not approach the high gear side excessively, and it becomes possible to start the vehicle from the state close to the maximum transmission ratio as far as possible.

Succeedingly at step 63, the above described actual transmission ratio i is replaced by the desired transmission ratio ia. This is performed for the purpose of safety. Even if such a situation as to cause a jump from the control loop 50 in starting to the control loop 51 after starting should happen as a result of false operation, therefore, a difference does not appear between the control loops and an unexpected transmission operation is prevented.

If it is decided at the step 52 that the vehicle is not in the stop state and the program proceeds to the control loop 51 after starting, the actual transmission ratio i is compared in magnitude with the desired transmission ratio ia at step 70. If i ≧ ia at step 70, i.e., if the actual transmission ratio i is located at the low gear side as compared with the desired transmission ratio or those transmission ratios are equal each other, the program proceeds to step 71 to change the flag to a logic 1. If the actual transmission ratio i is located at the high gear side as compared the desired transmission ratio i at step 70, the program proceeds to step 72.

At step 72, it is decided whether the vehicle speed is larger than a predetermined recovery speed K or not. If the vehicle speed is larger than K4, the program proceeds to step 71. If the vehicle speed is smaller than K4, the program proceeds to step 73. The recovery speed K4 is the maximum value of the vehicle speed in case where the pulley width must be surely returned to the initial state after the belt pressing operation performed by the control loop 50. The recovery speed K4 is typically Because the transmission control is typically started at a velocity speed larger than 10 km/hour.

At step 73, the flag state is checked. If the flag is a logic 1, the program proceeds to the above described step 71. If the flag is a logic 0, the program proceeds to steps 74 and 75 for performing the recovery operation. Once the flag becomes a logic 1 after the vehicle has been started, the step 71 thus functions to assure the normal transmission control.

At step 74, the duty factor of the pulse signal supplied to the d.c. motor 43, i.e., the motor duty is set at a predetermined value K5. The predetermined value K5 is a duty factor capable of rotating the d.c. motor 43 in such a direction as to broaden the pulley width of the drive pulley 40 at the time of recovery. A suitable value of K5 is 3%. If the value of K5 is too large, the powerful return might cause slider engagement. At step 75, a signal for rotating the d.c. motor 43 clockwise to the low gear side is generated as a control signal together with a pulse signal having a duty factor K5. The clockwise rotation signal rotates the d.c. motor 43 clockwise via the motor drive circuit 24 to broaden the pulley width of the drive pulley 40. As a result, change of the pulley width to the high gear side caused by the belt pressing operation in the control loop 50 is recovered and the original initial state is restored. When the control loop 51 is entered for the first time under the state that the actual transmission ratio is located at the low gear side as compared with the desired transmission ratio and the vehicle speed is low, the transmission operation is thus surely performed from the transmission ratio of the low gear side, and smooth starting of the vehicle is assured.

At step 71, the flag is changed to a logic 1, and thereafter the program proceeds to step 80 shown in FIG. 5. At step 80, the actual transmission ratio i is compared in magnitude with the desired transmission ratio ia again. If those transmission ratios are equal each other at step 80, the program proceeds to step 81. At step 81, a control signal for stopping the d.c. motor 43 is outputted to stop the pulley width control, i.e., the transmission control.

If it is determined at step 80 that i > ia, i.e., the actual transmission ratio i is located at low side as compared with the desired transmission ratio ia, the program proceeds to step 82. At step 82, it is decided whether the transmission ratio is a high maximum or not. If the transmission ratio is the high maximum, the program proceeds to step 81, in which the d.c. motor 43 is stopped so that the transmission may not be performed beyond the high maximum transmission ratio. Unless the transmission ratio is minimum, the program proceeds from the step 82 to step 83, in which the d.c. motor 43 is rotated counterclockwise to the high gear side and the transmission control is so performed as to make the actual transmission ratio approach the desired transmission ratio.

If it is determined at the step 80 that i < ia, i.e., the actual transmission ratio i is located at the high side as compared with the desired transmission ratio ia, the program proceeds to step 84. At the step 84, it is decided whether a limit switch which turns on at the time of low maximum transmission has turned on or not. If the limit switch is on, the program proceeds from the step 84 to the step 81 to stop the d.c. motor 43 so as to prevent transformation beyond the low maximum transmission. Unless the limit switch is on, the program proceeds from the step 84 to step 85, in which the d.c. motor 43 is rotated clockwise to the low gear side.

In this way, the transmission control succeeding the vehicle start is carried out.

It is evident from the foregoing description that in an automatic transmission apparatus according to the present invention the pulley width of the continuously variable transmission mechanism of belt type is forcibly narrowed and the pressing force with respect to the belt is enhanced. As a result, a slip is not caused between the pulley and the belt when the vehicle is started, and a shock is prevented. Further, such control is performed only by making the control unit output the control signals. By using simple configuration, therefore, the vehicle can be started smoothly. And the excellent driving performance obtained by using the continuously variable transmission mechanism of belt type can be fully demonstrated.

We claim:

1. An automatic transmission method for vehicles in which a plurality of input data relating to a vehicle are inputted, and based on the input data, a pulley width of a continuously variable transmission of belt type is changed and concurrently therewith an effective diameter of the pulley is changed to control a transmission ratio substantially continuously, comprising:

a first step for deciding whether the vehicle is in a start state or a stop state, for selecting a first control loop when the vehicle is in the stop state, and for selecting a second control loop when the vehicle is in the start state, a second step for deciding whether an accelerator is on or not when the first control loop is selected by the first step;

a third step for deciding whether an opening of the accelerator is larger than a first predetermined value when the second step decides that the accelerator is on;

a fourth step for setting a motor duty factor to a second predetermined value when the third step decides that the opening of the accelerator is larger than the first predetermined value; and a fifth step for rotating the motor to a high gear side when the second predetermined value is set by the fourth step.

2. An automatic transmission method for vehicles according to claim 1, further comprising:
a sixth step for comparing an actual transmission ratio with a desired transmission ratio when the second control loop is selected by said first step;
a seventh step for setting the motor duty factor to a third predetermined value when the sixth step decides that the actual transmission ratio is smaller than the desired transmission ratio; and
an eighth step for rotating the motor to a low gear side when the third predetermined value is set by the seventh step.

* * * * *